June 27, 1950 T. ANDERSEN ET AL 2,512,733
HYDRAULICALLY OPERATED BOOM
Filed June 26, 1946
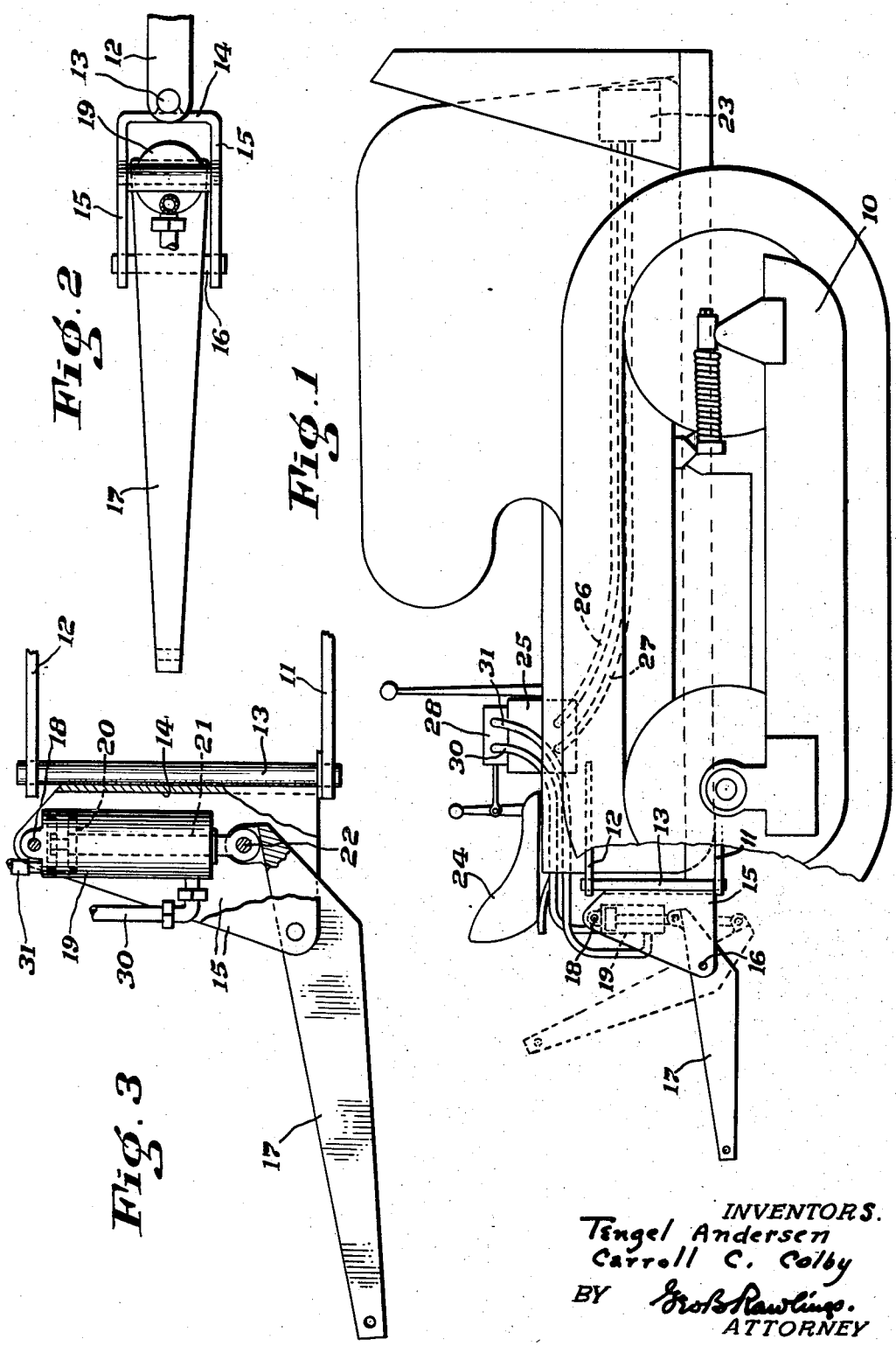
INVENTORS.
Tengel Andersen
Carroll C. Colby
BY Gross Rawlings.
ATTORNEY Patented June 27, 1950

2,512,733

UNITED STATES PATENT OFFICE 2,512,733

HYDRAULICALLY OPERATED BOOM

Tengel Andersen, Staten Island, N. Y., and
Carroll C. Colby, Bloomfield, N. J.

Application June 26, 1946, Serial No. 679,506

1 Claim. (Cl. 214—130)

Our present invention relates to an improved form of boom, and more particularly to a compact, power-operated, variably positionable hydraulic boom adapted for use on self-propelled vehicles, such as wheel and crawler type tractors in place of, or in addition to, the usual type of fixed boom.

The boom of our present invention is a very compact unit, requiring the minimum amount of space, and can be attached to, or removed from, a tractor or other vehicle in a short time. It has the minimum number of moving parts and positive power, and requires no particular skill to operate. It is further characterized in that it has a rearwardly extending arm which swings automatically with the tractor, thereby eliminating side strain on the boom, but which arm may be locked, if desired.

Power of operation is achieved through the use of a hydraulic pump, mounted ahead of the tractor main clutch, a hydraulic control valve, mounted within easy reach of the operator, and one or more hydraulic cylinders.

The hydraulic system is of the "closed type" using a three-position operating valve which delivers power to both ends of the hydraulic cylinder thereby making possible the application of power both up and down on the boom itself.

The uses for our attachment are many and varied. In the use of the standard boom, which is generally attached to a wheel or crawler tractor in one fixed and permanent position, there is much left to be desired in that the boom may while operating under certain conditions and while pulling certain implements etc., be found to be either too high or too low for efficient operation.

With the use of our hydraulic boom it is possible by moving the control lever to raise or lower the boom, thus changing the line of pull and increasing the tractive effort of the tractor under varied conditions.

Our hydraulic boom, along with different attachments for same, may be used in the control and operation of agricultural implements, logging equipment, trenching and backhoe equipment, boom operations (as the handling and loading of logs and equipment and materials in and around industrial plants), rear mounted earth moving scoop control, and as a straight pulling boom.

The design of our hydraulic boom makes it possible to attach the same to any size, make or model of either wheel or crawler tractor.

Our improved boom is particularly adapted for use in logging operations, and for the purposes of this application we shall discuss it in such use. It is to be understood, however, that such discussion is purely illustrative and in no way limiting, since the principles of our invention are applicable to a wide variety of commercial adaptations.

Accordingly an object of our invention is an improved hydraulic boom adapted for use with tractors or other similar self-propelled vehicles.

Another object is an improved hydraulic boom including a freely swinging arm extending generally upwardly and rearwardly.

A further object is an improved hydraulic boom including a swinging arm mounted on a support for rotary movement on a vertical axis and for swinging movement in a vertical plane on a horizontal axis.

A still further object is a hydraulic boom having an arm pivotally movable in a vertical plane with means for locking the arm in any desired position.

Other objects and novel features of the construction of our improved device will appear as the description of the invention progresses.

In the accompanying drawings wherein we have illustrated a preferred embodiment of our invention:

Figure 1 is a side elevation showing a conventional tractor of the crawler type equipped with our improved hydraulic boom.

Figure 2 is a plan view of the hydraulic boom, and

Figure 3 is a side elevation thereof.

Referring to the drawings, we have designated generally at 10 a tractor of the crawler type to which our improved boom is attached. Secured to the rear of tractor 10 is a pair of spaced horizontally extending lower and upper bearing plates 11 and 12. Rotatably mounted in said bearing plates is a vertically disposed pivot shaft 13.

Secured to shaft 13, as by welding, is the crossbar or front end 14 of a yoke-like swinging member, the two rearwardly extending side plates 15 of which are arranged parallel to and spaced apart from each other. Journaled in said side plates 15 adjacent the lower end thereof is a transverse shaft 16, on which and between plates 15 is mounted an arm or short boom 17. The front end of the boom 17 is housed within the space defined by the side plates 15. Journaled in said side plates 15 adjacent the upper end thereof is a transverse shaft 18 and pivotally mounted on shaft 18 is the upper end of a vertically disposed hydraulic ram cylinder 19. Cylinder 19 is housed in the space between the side plates 15 and swings freely on the transverse shaft 18. Within cylinder 19 is the usual piston 20 to which is secured the piston rod 21. Piston rod 21 extends downwardly beyond the cylinder and is pivotally attached at 22 to the forward end of boom 17. The rear end of boom 17 may be forked, or may be provided with means for attaching hooks, chains or like grapples for connecting a load, or tools, or other devices to the boom.

Mounted on the tractor 10, preferably adjacent the front end thereof, and connected to the motor (not shown) of the tractor is an oil pump 23. Mounted on the tractor, preferably towards the end adjacent to the driver's seat 24, is an oil tank 25 which is connected to oil pump 23 by flexible pipes 26 and 27. Mounted on the oil tank 25 is a valve box 28 under control of the operator through a control lever 29. The cylinder 19 is connected to the valve box by pipes 30 and 31. Pipe 30 controls the lifting movement of the piston 20 and pipe 31 controls the downward movement of said piston.

If the apparatus is used to haul logs, it is preferable to attach a chain or similar grapple means to the rear end of boom 17 to provide a flexible connection between the boom and the load, as then the rear of the boom 17 may be raised sufficiently to lift the forward end of the log off the ground, and compel the rear end of the log to skid along the surface of the road, with no danger that the forward end of the log will dig into the earth, as is the case where the log is merely dragged horizontally along the ground when coupled to the ordinary and usual boom. Also when the forward end of the log is lifted off the ground, the boom 17 is practically locked in proper position, but always under the control of the operator.

If the device is used, for example, with a scoop, plow or other agricultural tools, the selected tool may be rigidly attached to the rear end of the boom 17 and the boom hydraulically raised or lowered to regulate the depth of cut to be taken by the tool, and to raise the tool completely off the ground when transporting the same from place to place.

If desired, the arrangement may be reversed so that the hydraulic jack will pull the lifting arm, instead of pushing it, as heretofore described.

It has been found in logging operations that the efficiency of the tractor was increased approximately 50% by the use of our hydraulic boom. This was due to the fact that with the use of a pair of logging tongs attached to the end of the hydraulic boom it was possible for the operator, while remaining in the tractor seat, to attach the tongs to the butt of the log, raise this end of the log from the ground and travel with the log in this position, as contrasted with standard practice in pulling logs with the standard type of fixed boom where the logging chain was attached to the tractor at one end and the log at the other with the result that the log offered considerable resistance to the tractor in that the butt of the log was pulled into the earth instead of up out of the earth during the towing cycle. Considerable time was also saved with our boom, due to the fact that the operator could attach or release the tongs attached to the log at one end and the hydraulic boom at the other without leaving the tractor seat. It was also an advantage of considerable importance that during the pulling or towing cycle the line of pull could be raised or lowered under certain conditions to increase the tractive effort of the tractor.

When a ten foot boom is attached to the hydraulic boom, it is possible to load logs on trucks, handle various loading operations within and around industrial plants, and lay pipeline in ditches and various other operations where the use of a boom is required.

Our hydraulic boom may be used as a replacement for the standard type boom, and may be attached to all conventional type tractors, or it may be used as a standard boom. In either instance, it makes possible the quick, convenient and accurate handling or lifting of various farm implements, operating trench equipment, loading material on trucks, picking up logs in the butt (as in the pulpwood projects) and hauling many times more logs than can be hauled when the logs are dragged horizontally on the ground.

If desired, a boom extension may be attached to boom 17, thus making it possible to load trucks.

Various other uses and attachments for the device will readily suggest themselves to those skilled in the art, and various modifications in the construction and design shown may likewise be made without departing from the spirit and scope of our invention as pointed out in the appended claim.

We claim:

For attachment to a tractor having a pair of spaced rearwardly extending bearing plates and a vertically disposed shaft mounted in said plates, a yoke-like member secured to said shaft, a second shaft extending transversely between the side portions of said yoke-like member near the lower end thereof, a boom pivoted between its ends to said second shaft with its forward end extending between the side portions of said yoke-like member, a third shaft parallel to said second shaft and extending transversely between the side portions of said yoke-like member near the upper end thereof, a vertically disposed cylinder pivotally attached at its upper end to said third shaft and housed between the side portions of said yoke-like member, a piston rod and piston slidable in said cylinder, a pivotal connection between the lower end of the piston rod and the forward end of said boom, and operator-controlled means for supplying fluid under pressure to either side of said piston for controlling the position of said boom.

TENGEL ANDERSEN.
CARROLL C. COLBY.

REFERENCES CITED

The following references are of record in the file of this patent:

UNITED STATES PATENTS

| Number | Name | Date |
|---|---|---|
| 1,630,800 | Page | May 31, 1927 |
| 1,868,562 | Chubb et al. | July 26, 1932 |
| 1,939,950 | Brown | Dec. 19, 1933 |
| 2,019,938 | Stephens | Nov. 5, 1935 |
| 2,045,793 | Pearson et al. | June 30, 1936 |
| 2,183,478 | Holmes et al. | Dec. 12, 1939 |
| 2,216,697 | Vossenberg | Oct. 1, 1940 |
| 2,320,168 | Benjamin et al. | May 25, 1943 |
| 2,375,970 | Williams | May 15, 1945 |
| 2,411,061 | Saxon | Nov. 12, 1946 |
| 2,437,010 | Way | Mar. 2, 1948 |